US011905119B2

United States Patent
Hausecker et al.

(10) Patent No.: US 11,905,119 B2
(45) Date of Patent: Feb. 20, 2024

(54) CONVEYOR BOWL, VIBRATORY CONVEYOR DEVICE HAVING THE CONVEYOR BOWL, AND METHOD FOR PRODUCING THE CONVEYOR BOWL

(71) Applicant: Schaeffler Technologies AG & Co. KG, Herzogenaurach (DE)

(72) Inventors: Jörg Hausecker, Herzogenaurach (DE); Marc Schleicher, Frensdorf (DE); Georg Spiess, Herzogenaurach (DE); Norbert Staudigel, Hessdorf-Klebheim (DE); Robert Burkard, Forchheim (DE); Klaus Schindler, Spalt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/618,089

(22) PCT Filed: May 27, 2020

(86) PCT No.: PCT/DE2020/100448
§ 371 (c)(1),
(2) Date: Dec. 10, 2021

(87) PCT Pub. No.: WO2021/008646
PCT Pub. Date: Jan. 21, 2021

(65) Prior Publication Data
US 2022/0315346 A1  Oct. 6, 2022

(30) Foreign Application Priority Data

Jul. 18, 2019 (DE) .................... 10 2019 119 498.9

(51) Int. Cl.
*B65G 27/02* (2006.01)
*B65G 47/14* (2006.01)
*B65G 27/10* (2006.01)

(52) U.S. Cl.
CPC ......... *B65G 27/02* (2013.01); *B65G 47/1421* (2013.01); *B65G 27/10* (2013.01)

(58) Field of Classification Search
CPC ........................... B65G 27/02; B65G 47/1421
(Continued)

(56) References Cited

U.S. PATENT DOCUMENTS 5,335,778 A * 8/1994 Wilkens ............... B65G 25/065
198/750.3
5,472,079 A * 12/1995 Yagi ....................... G05D 19/02
198/756

(Continued)

FOREIGN PATENT DOCUMENTS

| CN | 102040078 A | 5/2011 |
| CN | 103043380 A | 4/2013 |

(Continued)

OTHER PUBLICATIONS

US 2005/0090348 A1, Tohara, Apr. 28, 2005.*
(Continued)

*Primary Examiner* — Douglas A Hess

(57) ABSTRACT

A conveyor bowl for a vibratory conveyor device includes a main body made of stainless steel and manufactured by primary shaping. The main body has an interface section for coupling to a vibration unit, and a conveyor section for conveying conveyed parts. The main body may be designed as a cast part. The main body may be a precision cast part or an investment cast part. The main body may be made of austenite. The interface section and the conveyor section may be formed in one piece or formed integrally with the main body.

10 Claims, 4 Drawing Sheets

(58) Field of Classification Search
USPC .......................................................... 198/757
See application file for complete search history.

(56) References Cited

U.S. PATENT DOCUMENTS

| | | | | |
|---|---|---|---|---|
| 5,913,428 | A * | 6/1999 | Graham | B65G 47/1421 |
| | | | | 221/160 |
| 6,041,914 | A * | 3/2000 | Graham | B65G 27/02 |
| | | | | 198/757 |
| 6,129,200 | A | 10/2000 | Graham | |
| 7,325,671 | B2 * | 2/2008 | Super | B65G 27/02 |
| | | | | 198/756 |
| 7,648,047 | B2 * | 1/2010 | Lewis | B23P 19/003 |
| | | | | 221/196 |
| 7,789,215 | B1 * | 9/2010 | Snyder | B65G 27/02 |
| | | | | 198/757 |
| 8,251,204 | B1 * | 8/2012 | Mazza | B65G 27/24 |
| | | | | 198/758 |
| 8,700,208 | B2 * | 4/2014 | Kim | B65B 35/14 |
| | | | | 700/240 |
| 8,733,539 | B2 * | 5/2014 | Choy | B65G 27/02 |
| | | | | 198/759 |
| 8,978,869 | B2 * | 3/2015 | Schombert | B65G 47/1464 |
| | | | | 198/392 |
| 10,239,698 | B1 * | 3/2019 | Stemmerich | B65G 47/1421 |
| 11,111,800 | B2 * | 9/2021 | Rettberg | F01D 5/34 |
| 11,374,474 | B2 * | 6/2022 | Katsuki | H02K 1/28 |
| 2019/0193270 | A1 | 6/2019 | Charbonnet | |

FOREIGN PATENT DOCUMENTS

| | | |
|---|---|---|
| CN | 206645472 U | 11/2017 |
| CN | 113710596 A | 11/2021 |
| DE | 10351400 A1 | 6/2005 |
| EP | 0936162 A1 | 8/1999 |
| GB | 2030731 A | 4/1980 |
| JP | S48067466 U | 8/1973 |
| JP | S504464 U | 1/1975 |
| JP | H01220625 A | 9/1989 |
| JP | H0881042 A | 3/1996 |
| JP | 2000109208 A | 4/2000 |
| JP | 2001039530 A | 2/2001 |
| JP | 2001171822 A | 6/2001 |
| JP | 2012076848 A | 4/2012 |
| JP | 2013032203 A | 2/2013 |

OTHER PUBLICATIONS

Source: Begriffssbestimmung fur die Einteilung der Stable/ Definition for the classification of steels Date: Mar. 2000.
Source: Angabe der Oberflachenbeschaffenheit in der technischen Produkt dokumentation/ Specification of the surface finish in the technical product documentation Date: Jan. 2002.
Source: Geometrische Produktspezifikation / Geometrical Product Specifications Date: Jan. 2008.
Source: Austenitische Gusseisen/ Austentic cast iron; By Dr. Klaus Rohrig et al Date: Dec. 2004.

* cited by examiner

CONVEYOR BOWL, VIBRATORY CONVEYOR DEVICE HAVING THE CONVEYOR BOWL, AND METHOD FOR PRODUCING THE CONVEYOR BOWL

CROSS-REFERENCE TO RELATED APPLICATIONS

This application is the United States National Phase of PCT Appln. No. PCT/DE2020/100448 filed May 27, 2020, which claims priority to German Application No. DE102019119498.9 filed Jul. 18, 2019, the entire disclosures of which are incorporated by reference herein.

TECHNICAL FIELD

The present disclosure relates to a conveyor bowl. The present disclosure also relates to a vibratory conveyor device having the conveyor bowl and a method for producing the conveyor bowl.

BACKGROUND

Vibratory conveyors move components or materials through oscillations or vibrations that act on a conveyor structure in which the components or materials are arranged. The oscillations or vibrations are set in such a way that the components or materials are transported with low friction in a conveying direction and are transported under a frictional load when the vibratory conveyor moves in the opposite direction on the counterstroke, so that the movement of the components or materials in the direction opposite to the conveying direction is inhibited. As a result, with each stroke, at least one component of the movement remains in the conveying direction, so that the components or materials are transported in the conveying direction.

For example, the document EP 09 361 62 A1 discloses a vibratory conveyor with laterally mounted drive devices, the vibratory conveyor having a conveyor structure which transports a material to be conveyed and is made of metal.

SUMMARY

The present disclosure proposes a conveyor bowl for a vibratory conveyor device which has good functional properties and/or can be manufactured in a reproducible manner.

The present disclosure relates to a conveyor bowl which is suitable and/or designed for a vibratory conveyor device. The conveyor bowl collects a material to be conveyed and moves it along a conveyor track. The movement takes place by means of oscillations or vibrations which are generated by a vibration unit of the vibratory conveyor device, and which act on the conveyor bowl. Generally, the conveyed product can be a material, e.g., a bulk material, or components or other objects. In an example embodiment, the conveyed product is formed with a maximum dimension per conveyed part of the conveyed product of less than 3 cm.

In addition to this transport function, the conveyor bowl can also implement an alignment and/or sorting function for the conveyed product, e.g., for the conveyed parts, by aligning the conveyed product on the conveyor track so that it is issued at the end of the conveyor track in an aligned and/or ordered and/or positionally defined manner. For this purpose, the conveyor bowl can have structural features and/or means which lead to the alignment of the conveyed product. Such measures are known in principle from the prior art.

The conveyor bowl has a metallic main body, the main body having an interface section for coupling to the vibration unit. The coupling can take place directly; alternatively, it is possible that an intermediate component, e.g., an adapter component such as an intermediate plate, is arranged between the conveyor bowl and the vibration unit. Furthermore, the main body has a conveyor section for conveying product to be conveyed, e.g., conveyed parts. The conveyor section may form the conveyor track of the conveyor bowl.

The main body may consist of stainless steel manufactured via primary shaping. Stainless steel, e.g., according to EN 10020, refers to alloyed or unalloyed steels with a particular degree of purity, for example steels in which the sulfur and phosphorus content (what are termed contaminants) do not exceed 0.025% (by mass). Stainless steel may be designed to be rustproof.

With this implementation, the conveyor bowl has good functional properties, since it is abrasion-resistant and therefore resilient due to the stainless steel material. Due to the production via primary shaping, the conveyor bowl can be manufactured in a very reproducible manner. In addition, especially in the case of larger quantities, cost advantages are obtained over a complex mechanical structure made of sheet steel, for example. During construction of the conveyor bowl, care is taken to ensure that no blind holes, gaps or similar dead areas are formed in which the conveyed product could become stuck or permanently lodged, or in which dirt particles could accumulate.

In an example embodiment, the stainless steel is implemented as a non-rusting austenite, e.g., without the addition of sulfur (for example 1.4301 or 1.4307 or 1.4404 or 1.4571). Choosing a non-rusting stainless steel ensures that the conveyor bowl is suitable and/or can be approved for foodstuffs. The conveyed product may be provided as a foodstuff or as a conveyed part which must meet the requirements applicable to the food sector. The conveyed product may form part of the conveyor bowl and/or the vibratory conveyor device.

In an example embodiment, the main body is designed as a cast part, e.g., as a precision cast or investment cast part. The first step in precision casting is to manufacture a model of the subsequent casting mold. In a subsequent step, the model is immersed in a slip, e.g., into a ceramic slip, if necessary several times, with sand being sprinkled onto the resulting casting mold between the immersion processes. The process is repeated until the casting mold has the required stability.

The casting process may be carried out using the gravity method. This results in the conveyor bowl being formed with the bottom facing up and/or with the bowl opening facing down. The precision casting process also makes it possible to produce undercuts in the conveyor bowl. Since the production of the model can run with CAD-CAM support, for example, the conveyor bowl can be manufactured in a reproducible manner. Precision casting has advantages due to the surface quality, since the roughness is low, e.g., in the area of the conveyor track, due to the process.

In an example embodiment, the interface section and the conveyor section are formed in one piece in the main body, e.g., from the same cast body section, so that the oscillations and/or vibrations can be transmitted from the interface section to the conveyor section with little or no loss and without an impedance transition between individual sections.

The conveyor bowl can have a straight conveyor section, for example, or a spiral-shaped, e.g., conically spiral-shaped, screw-like and/or helical conveyor track. Alternatively or in addition, the rough shape of the conveyor bowl may be designed as a shell, e.g., with the outer contour as a rotationally symmetric shell. It is also possible for the conveyor section to have a plurality of such conveyor tracks.

The conveyor track may run from the bowl bottom to the bowl opening, encircling a main axis of the conveyor bowl several times, for example. The diameter of the conveyor track may increase from the bowl bottom to the bowl opening, and the conveyor track may be inclined outward. Thus, the conveyed product can be conveyed and the conveyor bowl with the conveyor section forming the conveyor track can be modeled simply as a cast part, e.g., a precision cast part, since undercuts do not occur or are at least reduced.

The main body may have a wall section, the wall section forming a lateral guide for the product to be conveyed along the conveyor track. The wall section may form a guide which runs radially outwards in relation to the main axis. The wall section may be formed from the same cast body section as the interface section and/or the conveyor section. The single-piece and/or integral design as a cast part further increases the mechanical stability of the conveyor bowl.

The disclosure also relates to a vibratory conveyor device including the conveyor bowl and a vibration unit. The conveyor bowl is connected to the vibration unit via the interface section so that oscillations and/or vibrations can be transmitted from the vibration unit to the conveyor bowl.

The vibratory conveyor device may be designed as a spiral conveyor device, e.g., a vibratory spiral conveyor device.

The present disclosure also relates to a method for producing the conveyor bowl, as described above. The method includes manufacturing the main body of the conveyor bowl by primary shaping. For example, the main body may be cast by precision casting.

A functional prototype for the conveyor bowl may be manufactured in a preparatory step. This preparatory step permits checking for the correct functioning of the functional prototype. The functional prototype is then captured three-dimensionally and/or CAD-modeled in order to generate a CAD model of the functional prototype. Starting from the CAD model, the CAD model for the conveyor bowl and/or main body is then derived as a basis for the model for the precision casting. As an alternative to the preparation step, the CAD model of the conveyor bowl can be manufactured exclusively by construction and/or modeling. The latter alternative has the advantage that the conveyor bowls can be designed exclusively in CAD programs, so that the production of the functional prototype is not necessary.

BRIEF DESCRIPTION OF THE DRAWINGS

Further features, advantages and effects of the disclosure result from the following description of exemplary embodiments and the attached figures. In the figures.

DETAILED DESCRIPTION

Figure 1:
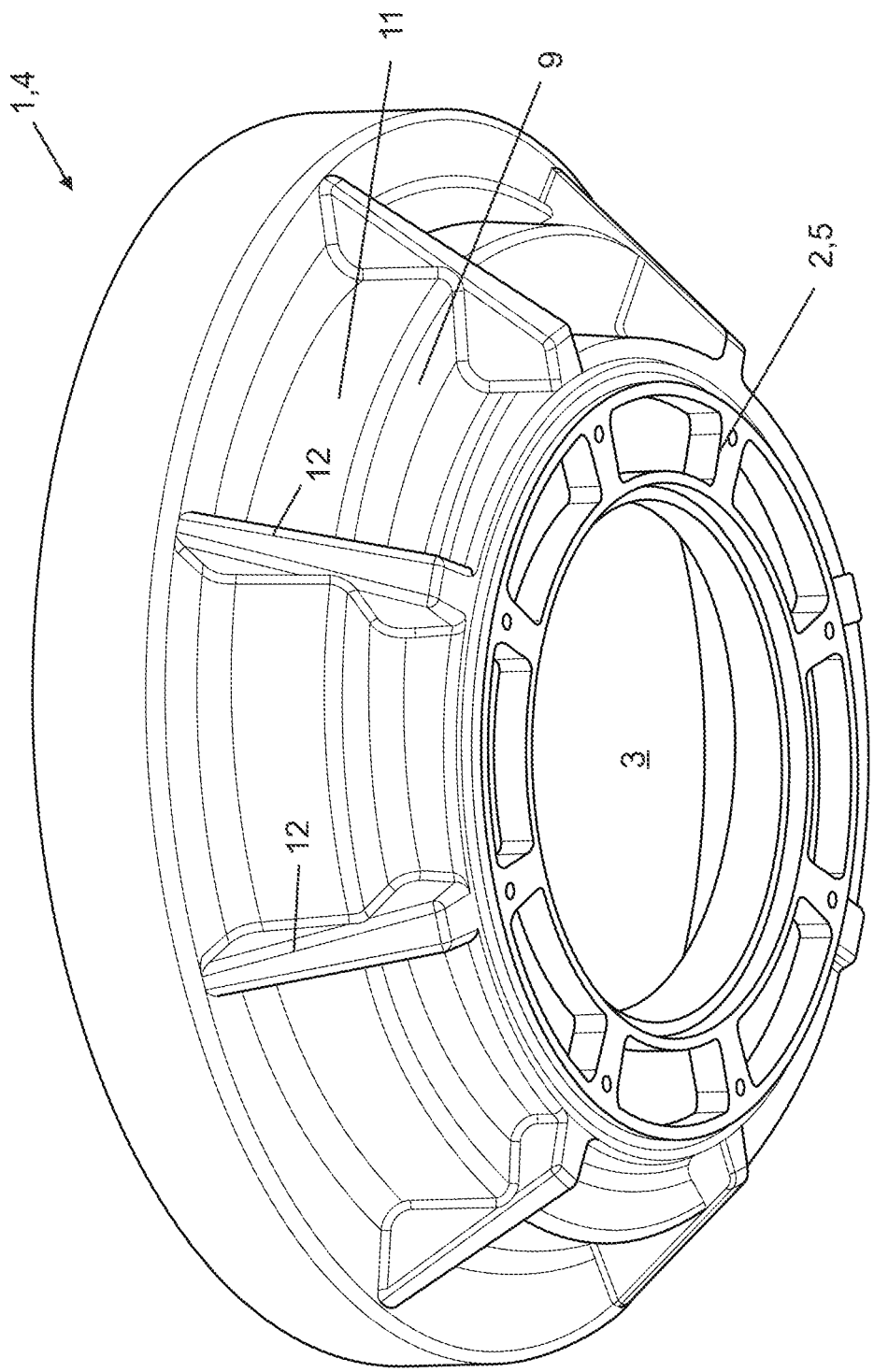
FIG. 1 shows a schematic, three-dimensional representation of a conveyor bowl in a view from below as a first exemplary embodiment of the disclosure.

FIG. 1 shows a conveyor bowl 1 as an exemplary embodiment of the disclosure in a schematic three-dimensional view. The conveyor bowl 1 is designed as a circular shell. In this exemplary embodiment, the bowl bottom 2 is designed without a base or baseless, so that a base opening 3 is formed.

The conveyor bowl 1 has a main body 4, the main body 4 being formed from a common section of material. For example, the main body 4 is formed as one piece and/or integrally.

Figure 2:
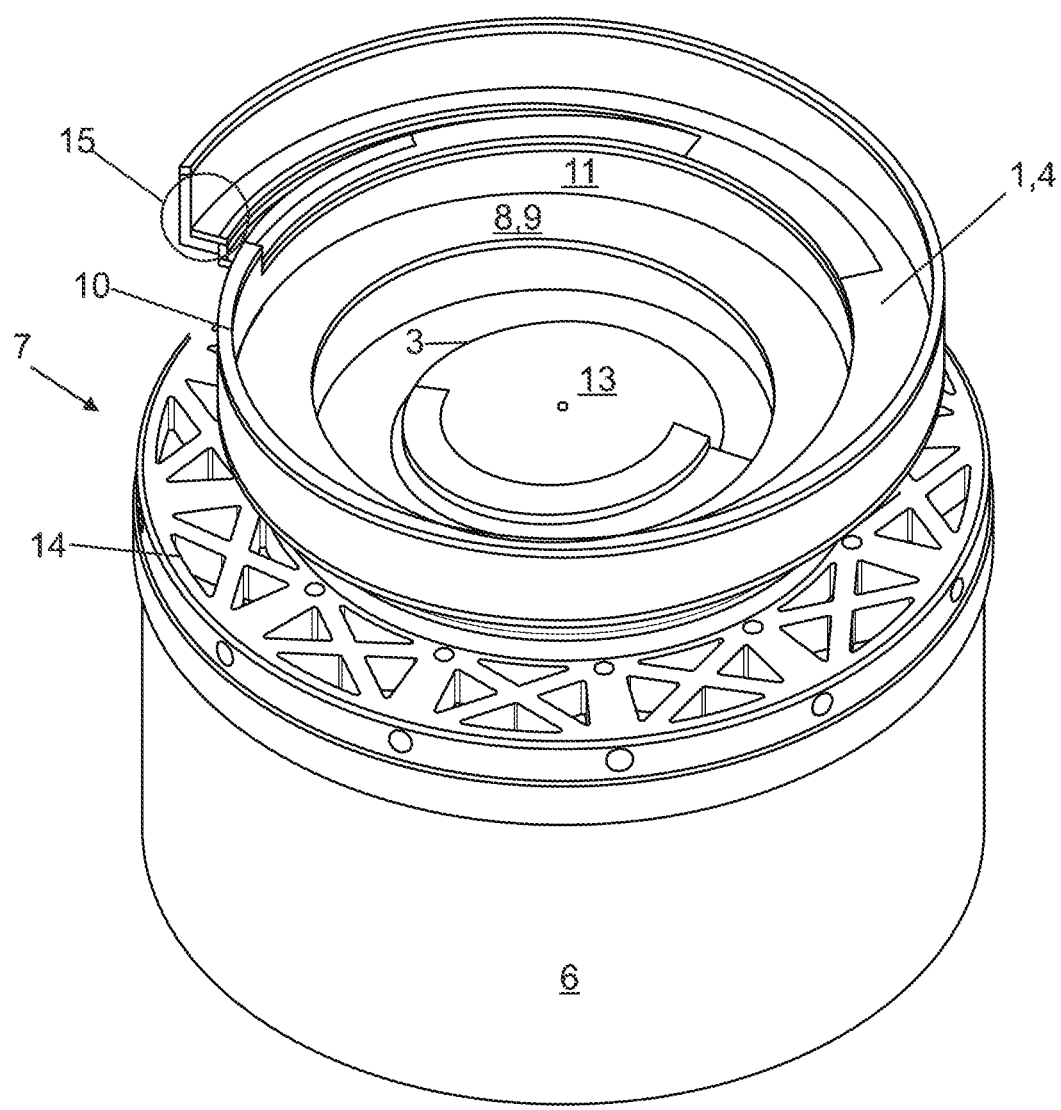
FIG. 2 shows a schematic three-dimensional sectional view of a vibratory conveyor device as a further exemplary embodiment of the disclosure.
Figure 3:
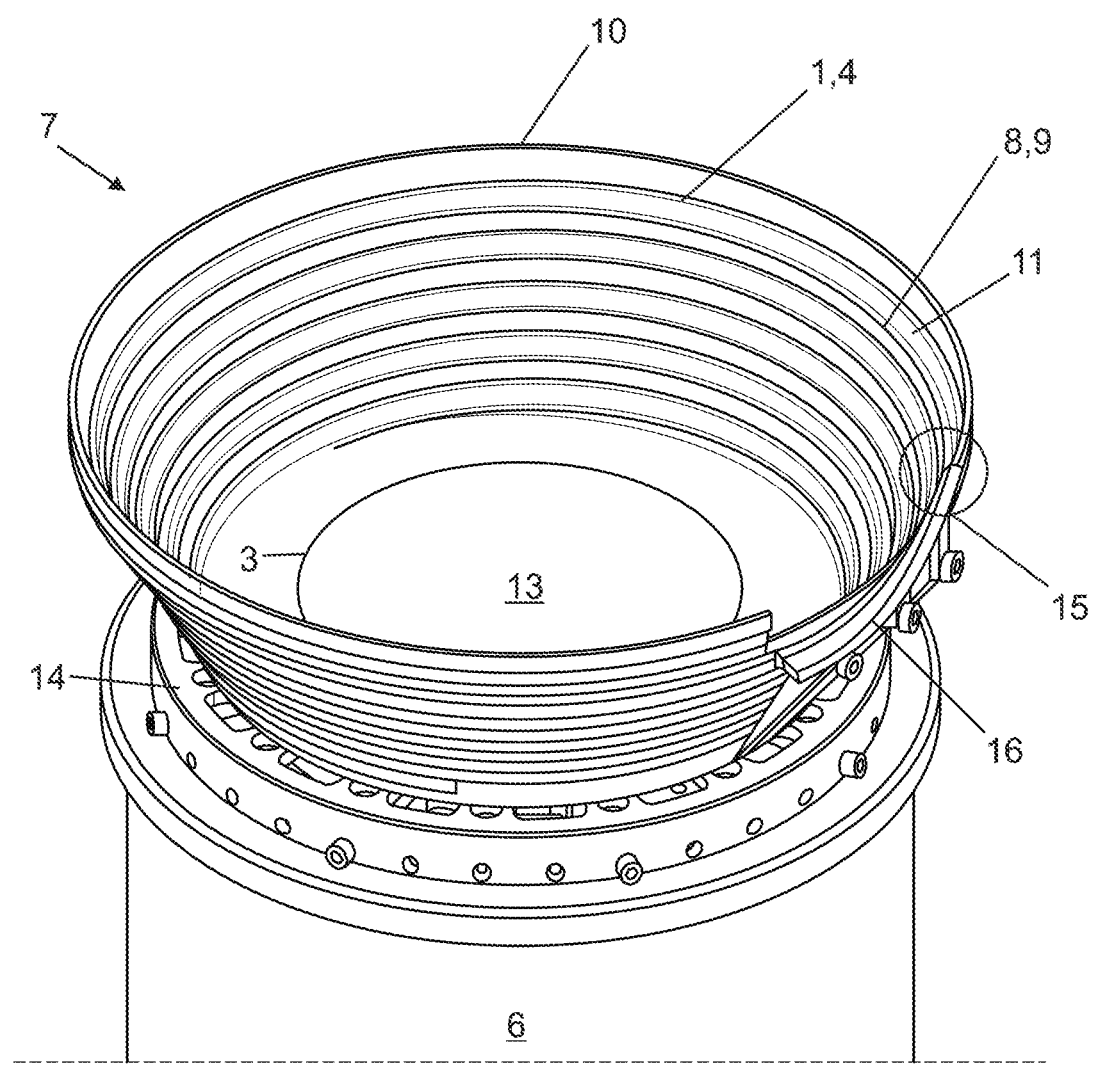
FIG. 3 shows a schematic three-dimensional sectional view of a vibratory conveyor device as a further exemplary embodiment of the disclosure.
Figure 4:
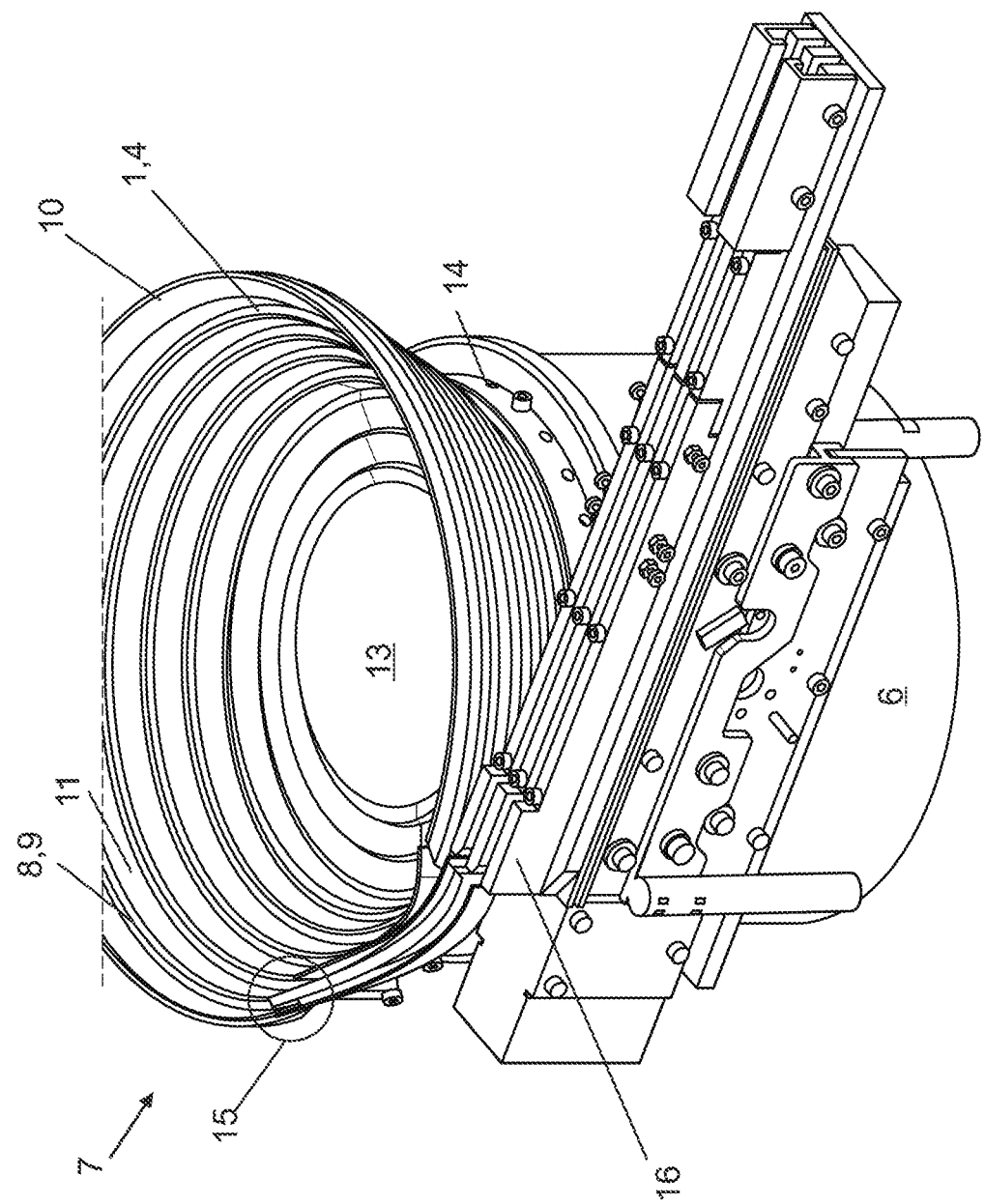
FIG. 4 shows a schematic three-dimensional sectional view of a vibratory conveyor device as a further exemplary embodiment of the disclosure.

From a structural point of view, the main body 4 has an interface section 5. The interface section 5 is for coupling the conveyor bowl 1 or the main body 4 to a vibration unit 6, where the vibration unit 6 is part of a vibrating conveyor device 7, as shown, for example, in FIG. 3 or in FIG. 4. Vibrations and/or oscillations are introduced into the conveyor bowl 1 via the interface section 5 to transport and orient conveyed product arranged in the conveyor bowl 1 along a conveyor track 8, as shown in FIGS. 2 to 4. The vibratory conveyor device 7 corresponds to a vibratory conveyor, for example a spiral conveyor or a vibratory spiral conveyor.

The conveyor track 8 is formed by a conveyor section 9, the conveyor section 9 being designed as a spiral ascending from the bowl bottom 2 in the direction of a bowl opening 10. The course and extension of the conveyor track 8 can be formed by a radial vector rotating about a main axis and simultaneously ascending in the direction of the bowl opening 10 along the main axis, e.g., inclined outwards.

Furthermore, the conveyor bowl 1 and/or the main body 4 has a wall section 11, the wall section 11 forming a radial boundary towards the outside for the conveyor track 8. From a structural point of view, the wall section 11 connects the individual spiral areas of the conveyor section 9 in the vertical direction of the conveyor bowl 1 and/or of the main body 4.

The main body has molded-on axial ribs 12 which extend in an axial direction to the main axis. The axial ribs 12 serve to increase the mechanical stability and/or rigidity of the conveyor bowl 1 and/or the main body 4 and support the casting behavior.

The main body 4 of the conveyor bowl 1 is made of stainless steel and can therefore be used for the transport of conveyed products that meet the regulations for the food sector. In particular, the steel is a stainless steel without added sulfur, such as 1.4301 or 1.4307 or 1.4404 or 1.4571. The main body 4 is produced via a primary shaping process, namely via a cast. More precisely, this is a precision casting process or an investment casting process. The melt is fed into the casting mold under gravity. For better demoldability, the main body 4 may be positioned in the casting mold with the bowl opening 10 facing downwards.

FIG. 2 shows the conveyor bowl 1 from FIG. 1 or a similar conveyor bowl 1, with the same reference symbols denoting the same sections, components, etc., in each case, as is also the case in the following figures.

In FIG. 2, the spiral conveyor track 8 can be seen, which is formed as a surface on the conveyor section 9. The wall section 11 can also be seen. In principle, the bowl bottom 2 can be closed off in one piece in the main body 4 with a base section (not shown). For weight reasons, however, the bowl bottom 2 may be formed by a base 13 which is made of plastic.

In FIG. 2, an intermediate plate 14, also made of plastic, can also be seen, which forms an adapter between the vibration unit 6 and the conveyor bowl 1. As an alternative to this, the conveyor bowl 1 can also be connected directly to the vibration unit 6 for transmitting the vibrations and/or oscillations. In terms of the mode of operation, the product to be conveyed is transported along the conveyor track 8 to the output 15 by the vibrations and/or oscillations.

FIG. 3 shows an alternative embodiment of a vibratory conveyor device 7, which differs in the dimensions of the conveyor section 9 and wall section 11, for example. Furthermore, the base 13 is designed to be larger than in FIG. 2 and the intermediate plate 14 is also implemented differently. In the same way as before, the conveyor section 9 forms the conveyor track 8, which conveys the conveyed product from the base 13 to an output 15, to which a material guiding device 16 is connected.

FIG. 4 shows a further exemplary embodiment of a vibratory conveyor device 7, this in turn having a different conveyor bowl 1, which differs in the dimensions of the conveyor section 9 and wall section 11. In the exemplary embodiment in FIG. 4, the output 15 is connected to a material guiding device 16, which is designed as a linear conveyor and transports and/or orients the conveyed product.

Thus, a conveyor bowl 1, designed as a vibratory conveyor bowl and made of cast stainless steel is proposed, which is manufactured using the precision casting process. The precision casting may have an average roughness depth Rz, e.g., according to DIN EN ISO1302, of less than Rz 6.5, e.g., less than Rz 6.4, which results in the conveyed product, in particular the conveyor bowls (felt-like, silicone-like, plastic, metallic, etc.) can be conveyed more easily. The conveyor bowl may provide feeding of conveyed parts to machines and systems with the required performance and/or in the correct position across the entire value creation chain.

The vibration unit 6 and/or the oscillating conveyor device 7 may be designed as a rotary oscillating conveyor, for example. The conveyor bowl 1 is firmly connected to the vibration unit 6 as a drive so that the oscillation and/or vibration can be transmitted directly or indirectly to the conveyor bowl 1. The oscillation and/or vibrations cause the conveyor bowls to move and make it possible for them to be conveyed. The conveying behavior may be manipulated through partial coatings or linings. Attached, connected sorting devices, such as gutters, for example, can optionally be molded on or connected to the main body 4 as additional components. These sorting devices enable the conveyed parts can be transferred to the subsequent machines or their assemblies with the required performance and/or in the correct position.

REFERENCE NUMERALS

1 Conveyor bowl
2 Bowl bottom
3 Base opening
4 Main body
5 Interface section
6 Vibration unit
7 Vibratory conveyor device
8 Conveyor track
9 Conveyor section
10 Bowl opening
11 Wall section
12 Axial ribs
13 Floor
14 Intermediate plate
15 Output
16 Material guiding device

The invention claimed is:

1. A conveyor bowl for a vibratory conveyor device comprising:
   a main body made of stainless steel and manufactured by primary shaping, comprising:
      an interface section for coupling to a vibration unit; and
      a conveyor section for conveying conveyed parts, wherein the main body is formed in one piece and has integrally formed axial ribs which extend in an axial direction to a main axis of the main body.

2. The conveyor bowl of claim 1 wherein the main body is designed as a cast part.

3. The conveyor bowl of claim 2 wherein the main body is a precision cast part or an investment cast part.

4. The conveyor bowl of claim 1 wherein the main body is made of austenite.

5. The conveyor bowl of claim 1 wherein the conveyor section forms a conveyor track with a spiral-shape, a screw-like shape or a helical shape.

6. The conveyor bowl of claim 5 wherein:
   the main body comprises a bowl bottom and bowl opening; and
   the conveyor track or the conveyor section comprises a diameter that increases from the bowl bottom to the bowl opening.

7. The conveyor bowl of claim 5 further comprising a wall section, wherein the wall section forms a lateral guide along the conveyor track.

8. A vibratory conveyor comprising:
   a vibration unit; and
   the conveyor bowl of claim 1 operatively connected to the vibration unit.

9. The vibratory conveyor of claim 8 designed as a spiral conveyor device.

10. A method for producing the conveyor bowl of claim 1 comprising manufacturing the main body via primary shaping.

* * * * *